United States Patent [19]

Johansson et al.

[11] Patent Number: 5,643,414

[45] Date of Patent: Jul. 1, 1997

[54] SILICA SOLS IN PAPERMAKING

[75] Inventors: Hans Erik Johansson, Kungálv; Bo Valdemar Larsson, Partille, both of Sweden

[73] Assignee: EKA Nobel AB, Sweden

[21] Appl. No.: 265,785

[22] Filed: Jun. 27, 1994

Related U.S. Application Data

[62] Division of Ser. No. 855,647, May 8, 1992, Pat. No. 5,368,833.

[30] Foreign Application Priority Data

Nov. 9, 1989 [SE] Sweden ................... 8903753

[51] Int. Cl.$^6$ ................................. D21H 21/10
[52] U.S. Cl. ................. 162/164.6; 162/168.2; 162/168.3; 162/181.6; 162/183
[58] Field of Search .................. 162/175, 164.6, 162/168.2, 168.3, 164.3, 183, 181.6

[56] References Cited

U.S. PATENT DOCUMENTS

| | | | |
|---|---|---|---|
| 2,727,008 | 12/1955 | Iler | 252/313 |
| 2,754,270 | 7/1956 | Kimberlin, Jr. et al. | 252/313 |
| 2,892,797 | 6/1959 | Alexander et al. | 252/313 |
| 3,374,180 | 3/1968 | Marotta | 252/313 |
| 3,533,816 | 10/1970 | Oken et al. | 106/74 |
| 3,922,393 | 11/1975 | Sears, Jr. | 422/215 |
| 4,272,409 | 6/1981 | Bergna | 252/455 R |
| 4,385,961 | 5/1983 | Svending et al. | 162/175 |
| 4,388,150 | 6/1983 | Sunden et al. | 162/175 |
| 4,695,396 | 9/1987 | Rossman et al. | 252/135 |
| 4,927,498 | 5/1990 | Rushmere | 162/181.6 |
| 4,946,557 | 8/1990 | Svending | 162/168.3 |
| 4,980,025 | 12/1990 | Andersson et al. | 162/181.6 |
| 5,066,520 | 11/1991 | Freiberg et al. | 427/379 |
| 5,240,561 | 8/1993 | Kaliski | 162/181.6 |

FOREIGN PATENT DOCUMENTS

| | | |
|---|---|---|
| 0041056 | 12/1981 | European Pat. Off. . |
| 0261820 | 3/1988 | European Pat. Off. . |
| 1446101 | 12/1988 | U.S.S.R. . |
| WO86/00100 | 1/1986 | WIPO . |
| WO86/05826 | 10/1986 | WIPO . |
| WO89/06637 | 7/1989 | WIPO . |
| WO89/08741 | 9/1989 | WIPO . |

OTHER PUBLICATIONS

R.K. Iler, The Chemistry of Silica, John Wiley & Sons, Inc. 1979, pp. 7 and 174–175.

*Primary Examiner*—Peter Chin
*Attorney, Agent, or Firm*—Burns, Doane, Swecker & Mathis

[57] ABSTRACT

Silica sols having a high content of microgel and aluminum modified particles with high specific surface area. The sols can be prepared by a process comprising acidification of a water glass solution, alkalization at a certain dry substance content, particle growth and aluminum modification. The sols are particularly suitable for use as additives, in combination with cationic polymers, in papermaking.

15 Claims, No Drawings

SILICA SOLS IN PAPERMAKING

This application is a divisional, of Application Ser. No. 07/855,647, filed May 8, 1992 now U.S. Pat. No. 5,368,833.

The present invention relates to new silica sols, to a process suitable for the production of the sols and to the use of the new sols in the production of paper. More particularly the invention relates to new silica sols which have particles with a high specific surface area and which have a fairly high content of so called microgel. The new sols are particularly suitable for use in the production of paper as additives in combination with cationic polymers.

Silica sols, which term is used herein for silica hydrosols, are aqueous systems with very small silica particles which can be used in several fields of application, among other things dependent on the particle size. At the production of paper silica based sols with anionic particles have gained an increased utilization during the last few years. The silica sols are here used as additives to the stock in combination with cationic polymers, primarily to increase retention and dewatering at papermaking. In the European patent 41056 is for example disclosed the use of colloidal silica sols in combination with cationic starch in the production of paper. The PCT application WO 86/00100 and WO 86/05826 disclose combinations of silica sols, with particles where at least the surface groups contain aluminum, and cationic natural polymers and cationic polyacrylamides, respectively. It is generally stated that the silica particles have a specific surface area within the range of from 50 to 1000 $m^2/g$. The commercially used sols at production of paper are of the type which have colloidal particles with a particle size usually from about 4 to about 7 nm, i.e., a specific surface area of from about 700 to about 300 $m^2/g$ and above all sols with particles having a specific surface area of about 500 $m^2/g$ have been used commercially. It has generally been considered that sols with colloidal particles of the above given size have given the best results and they have also been preferred with regard to their stability. Quite generally it has been desired for silica sols which are to be used commercially that they are as monodisperse as possible, i.e., that they have as narrow particle size distribution as possible. Consequently work at the production of the sols has aimed at avoiding formation of microgel.

The present invention relates to new silica sols which are characteristic in that they have a comparatively low S-value and in that the sol particles have a high specific surface area. It has been found that these sols which contain anionic particles are useful at the production of paper and similar products and that they hereby in combination with cationic polymers, give very good improvement of retention and dewatering. In addition to silica sols as defined in the appended claims the present invention also relates to a process for the production of silica sols and to the use of the sols, as defined in the appended claims.

As mentioned above, the present silica sols are characteristic in that they have a high specific surface area, within the range of from 750 to 1000 $m^2/g$. The given specific surface area has been measured by means of titration with NaOH according to the method described by Sears in Analytical Chemistry 28(1956):12, 1981–1983. The specific surface area is suitably within the range of from 750 to 950 $m^2/g$ and preferably within the range of from 800 to 950 $m^2/g$. Another characteristic property of the present silica sols is their S-value, which in contrast to the S-value for known commercial sols used in paper production, is comparatively low. The S-value of the present sols is within the range of from 8 to 45 per cent, suitably from 10 to 35 per cent and preferably from 10 to 30. The given S-value has been measured and calculated as described by Iler, R. K. & Dalton, R. L. i J. Phys. Chem. 60(1956), 955–957. The S-value can be said to be a measure of the degree of aggregate or microgel formation and a lower S-value indicates a higher microgel content and can be seen as a measure of the amount of $SiO_2$, in per cent by weight, in the disperse phase. The particles in the present sols are further surface modified with aluminum to a degree of 2 to 25 per cent, suitably from 3 to 20 per cent. With an aluminum surface modification degree is meant the number of aluminum atoms which has replaced silicon atoms in the particle surface. The degree of modification is given in per cent and is calculated on basis of 8 silanol groups per $nm^2$. This is described by Iler, R. K. in Journal of Colloidal and Interface Science, 55(1976):1, 25–34. The S-value given for the sols is to a high degree correlated to the particle size distribution. The sols of the present invention have a comparatively broad particle size distribution by the aggregate formation. As an indication of this it can be mentioned that the sols as a rule contain more than 10 per cent by weight of the $SiO_2$-amount as aggregates with a size above 20 nm and usually more than 20 per cent of such aggregates. The given values are related to measurements with gel permeation chromatography (Column: Shodex B-806, Eluent: 0.05M $NaHCO_3$, pH adjusted to 9.2 with NaOH, Amount: 100 µl of sol with an $SiO_2$ content of 1%, Detection: Measurement of refractive index). The present sols suitably have a dry substance content, calculated as $SiO_2$, of from about 3 to about 15 per cent by weight, and preferably a dry substance content within the range of from about 5 to about 12 per cent by weight.

The invention also relates to a process for the production of silica sols which is suitable for the production of sols having comparatively low S-values and broad particle size distributions and having particles with a high specific surface area. The process of the invention is particularly suitable for the production of sols having the above given characteristic features.

According to the invention silica sols are prepared starting from conventional alkali water glasses, potassium or sodium water glass, preferably from sodium water glass. The mole ratio of $SiO_2$ to $Na_2O$ or $K_2O$, where $Na_2O$ and $K_2O$ in the following will be given as $M_2O$, in the water glass can, as per se known, be within the range of from 1.5:1 to 4.5:1 and is preferably within the range of from 2.5:1 to 3.9:1. A diluted solution of the water glass is utilized and this suitably has an $SiO_2$ content of from about 3 to about 12 per cent by weight, preferably from about 5 to about 10 per cent by weight. The water glass solution which usually has a pH around 13, or above 13, is acidified to a pH of from about 1 to about 4. The acidification can be carried out in per se known manner by addition of mineral acids, such as for example sulfuric acid, hydrochloric acid and phosphoric acid or optionally with other known chemicals for acidification of water glass such as ammonium sulphate and carbon dioxide. At addition of mineral acid the acidification is carried out in two steps, a first step to a pH of about 8 to 9, whereafter a certain ripening, i.e., a particle growth, is allowed to occur before further acidification to a pH of from about 1 to about 4. However, it is preferred that the acidification is carried out by means of acid cation exchangers which among other things lead to more stable products and give almost sodium free acid sols. The acidification is preferably carried out by means of strongly acid cation exchange resins, for example of sulfonic acid type. It is preferred that the acidification is carried out to a pH of from about 2.0 to 4.0 and most preferably from about 2.2 to about 3.0. The acid sol obtained after acidification is then made alkaline. The alkalization can be carried out with conventional alkali such as sodium, potassium or ammonium hydroxide. It is, however, preferred that alkalization is carried out by addition of water glass. Potassium and sodium water glass, particularly sodium water glass, with a moe ratio of $SiO_2$ to $M_2O$ as above described is used in this alkalization step. The $SiO_2$ content of the water glass solutions used for alkalization is suitably within the range of from about 3 to about 35 per cent by weight and preferably within the range of from 5 to 30 per cent by weight. The alkalization is suitably carried out to a pH of at the lowest equal to 8 and suitably to a pH within the range of from 8 to 11. The alkalization is further suitably carried out to a final mole ratio $SiO_2$ to $M_2O$ within the range of from about 20:1 to about 75:1, suitably within the range of from about 30:1 to about 60:1. At the preparation of a sol as above the degree of microgel can be influenced in several ways and be controlled to a desired value. The degree of microgel can be influenced by salt content, by adjustment of the concentration at the preparation of the acid sol and at the alkalization since in this step the degree of microgel is influenced when the stability minimum for the sol is passed, at a ph of about 5. By prolonged times at this passage the degree of microgel can be directed to the desired value. It is particularly suitable to control the degree of microgel by adjustment of the dry content, the $SiO_2$ content, at the alkalization whereby a higher dry content gives a lower S-value. By keeping the $SiO_2$ content at the alkalization in the range of from 7 to 4.5 per cent by weight the S-value can be controlled to the given values 8 to 45%. To obtain sols with S-values within the range from 10 to 30% the $SiO_2$ content at the alkalization is suitably kept within the range of from 6.8 to 5.5 per cent by weight. The acid sol has particles with a high specific surface area, above 1000 $m^2/g$ and usually around about 1300 $m^2/g$. After the alkalization a particle growth is carried out and thereby a decrease of the specific surface area. After the alkalization a growth process is thus carried out so that the desired specific surface area is obtained and this is subsequently stabilized by modification with aluminum. The desired decrease in surface area can be obtained by storage at room temperature during somewhat longer times, a day up to about two days and nights, or by heat treatment. At heat treatment times and temperatures are adjusted so that shorter times are used at higher temperatures. Even if it of course is possible to use fairly high temperatures during very short times it is, from a practical point of view, more suitable to use lower temperatures during somewhat longer times. From a practical point of view it is suitable to carry out the heat treatment at temperatures up to about 50° C. during shorter times, up to about 2 hours, for example to heat the sol to a temperature of about 35° C. during about 1 hour. Sols prepared in this manner have particles with a very high specific surface area, within the range of from 750 to 1000 $m^2/g$. To stabilize this high specific surface area, so that it will not decrease during storage, a surface modification is carried out. The modification of the surface for stabilization of the surface is an aluminum modification and is carried out by means of an aluminate, sodium or potassium aluminate, suitably sodium aluminate. The aluminum modification of the surface of the particles is carried out in per se known manner and to a surface modification degree of from 2 to 25 per cent, particularly to a degree of from 3 to 20, as stated earlier. If the sol, before the aluminum modification, contains too high amounts of sodium it should be made free from a too high excess of this which can be made by ion exchange. If an ion exchange is carried out a pH adjustment can be required before the aluminum modification, to a pH above 7, in order to prevent decomposition of the aluminate at the modification. According to the present process silica sols having dry contents of from about 3 to about 15 per cent by weight, after optional concentration, can be prepared and the produced sols show good storage stability, ie they can be stored for several months without any substantial decrease of the specific surface area and without gel formation.

The new sols, with anionic particles, according to the invention are particularly suitable at the production of paper. The present invention also relates to this use of the sols. As mentioned by way of introduction it is well known to use silica based sols in combination with cationic polymers at the production of paper, primarily in order to improve retention and drainage. The present silica sols are used in corresponding manner as earlier known for silica sols with anionic particles and they give, in combination with cationic polymers, a substantial improvement of retention and dewatering results are obtained as a result of the low S-value and the high specific surface area of the sols. In addition to the stabilization of the surface of the sol particles the aluminum modification also gives a maintained high negative charge also at acid pH, which is not the case for sols which have not been aluminum modified. This means that the sols can be utilized with good effect within the entire pH range of 4 to 10 at paper production. The improved dewatering also means that the speed of the paper machine can be increased and further that less water need to be dried off in the press and drying sections of the paper machine and an economically substantially improved paper production process is hereby obtained. The very much decreased sol dosage, calculated as $SiO_2$, required to obtained corresponding results as with commercial sols should be particularly mentioned.

The present invention thus also relates to a method for the production of paper having the characteristic features set out in the claims. As cationic polymer according to the invention such polymers which are conventionally used in paper production as retention and/or wet strength agent are suitable and they can be natural, ie based on carbohydrates, or synthetic. As examples of suitable cationic polymers can be mentioned cationic starch, cationic guar gum, cationic polyacrylamides, polyethyleneimines, polyamidoamines and poly(diallyldimethyl ammonium chloride). The cationic polymers can be used separately or in combination with each other. Preferred cationic polymers are cationic starch and cationic polyacrylamide. According to a particularly preferred embodiment the silica sols are used in combination with both cationic starch and cationic synthetic polymer and particularly then cationic polyacrylamide.

The amount of silica sol and cationic polymer at paper production according to the present invention can vary within wide limits depending, among other things, on type of stock, presence of fillers and other conditions. The amount of sol should suitably be at least 0.01 kg/t, calculated as $SiO_2$ on dry fibers and optional fillers, and is suitably within the range of from 0.05 kg/ton to 5 kg/ton and preferably within the range of from 0.1 to 2 kg/ton. The sol is suitably charged to the stock with dry contents within the range of from 0.1 to 5 per cent by weight. The amount of cationic polymer is to a high degree dependent on the type of polymer and on other effects desired from the polymer. For synthetic cationic polymers usually at least 0.01 kg/ton is used, calculated as dry on dry fibers and optional fillers. Suitably amounts of from 0.01 to 3 and preferably of from 0.03 to 2 kg/ton are used. For cationic polymers based on carbohydrates such as cationic starch and cationic guar gum amounts of at least 0.1 kg/ton, calculated as dry on dry fibers and optional fillers, are usually used. For these polymers amounts of from 0.5 to 30 kg/ton are suitably used and preferably from 1 to 15 kg/ton. The weight ratio of cationic polymer to sol calculated as $SiO_2$ should usually be at least 0.01:1 and suitably at least 0.2:1. The upper limit for cationic polymer is primarily a question of economy and of charge. For polymers with lower cationicity such as cationic starch, alone or in combination with other cationic polymers, very high amounts can thus be used, up to a ratio of 100:1 and higher, and the limit is mainly decided with regard to economy. For most system suitable ratios cationic polymer to sol, calculated as $SiO_2$, is within the range of from 0.2:1 to 100:1. When the silica sol is used together with a combination of cationic starch and cationic synthetic polymer, and preferably cationic polyacrylamide, the weight ratio between the two latter is suitably within the range of from 0.5:1 to 200:1 and preferably within the range of from 2:1 to 100:1. The present silica sols can of course be used in the production of paper in combination with paper chemicals which are conventional in papermaking such as hydrophobing agents, dry strength agents, wet strength agents etc. It is particularly suitable to utilize aluminum compounds in combination with the present sols and cationic polymers since it has been found that aluminum compounds can give an additional improvement of retention and dewatering. Any aluminum compound per se known for use in papermaking can be utilized, eg alum, polyaluminum compounds, aluminates, aluminum chloride and aluminum nitrate. Also the amount of aluminum compound can vary within wide limits and it is suitable to use the aluminum compound in a weight ratio to the sol, calculated as $SiO_2$, of at least 0.01:1, whereby the aluminum compound has been calculated as $Al_2O_3$. The ratio should suitably not exceed 3:1 and is preferably within the range of from 0.02:1 to 1.5:1. The polyaluminum compounds can for example be polyaluminum chlorides, polyaluminum sulfates and polyaluminum compounds containing both chloride and sulfate ions. The polyaluminum compounds may also contain other anions than chloride ions, for example anions from sulfuric acid, phosphoric acid, organic acids such as citric acid and oxalic acid.

The silica sols and the cationic polymers can be utilized at the production of paper from different kinds of stocks of cellulose containing fibers and the stocks should suitably contain at least 50 per cent by weight of such fibers, calculated on dry material. The components can for example be used as additives to stocks from fibers from chemical pulp, such as sulphate and sulphite pulp, thermomechanical pulp, refiner mechanical pulp or groundwood pulp, from as well hardwood as softwood and can also be used for stocks based on recycled fibers. The stocks can also contain mineral fillers of conventional types such as kaolin, titanium dioxide, gypsum, chalk and talcum. The terms paper and paper production which are used herein do or course include not only paper but also other cellulose fiber containing products in sheet or web form, such as pulp sheets, board and paper board and their production.

The sols can be utilized within a wide pH range at paper production, of from about 4 to about 10. Even if any order of addition can be used it is preferred that the cationic polymer is added before the sol. If both cationic starch and cationic synthetic polymer are used it is preferred that they are added in this order.

The present invention is further illustrated in the following examples which, however, are not intended to limit the same. Parts and per cent relate to parts by weight and per cent by weight, respectively, unless otherwise stated.

EXAMPLE 1A–1 L

The preparation of sols according to the invention are shown in these examples. In all examples water glass, sodium silicate, with a molar ratio $SiO_2$ to $M_2O$ of about 3.5 was used, if no other information is given, and all the solutions of sodium aluminate had an $Al_2O_3$ content of 25%.

EXAMPLE 1A 3400 g of a sodium silicate solution with an $SiO_2$ content of 24.2% was diluted with 11560 g of water (to a content of 5.5%). The obtained solution was then pumped through a column filled with cation exchange resin of the type Amberlite IR-120. 14000 g of the ion exchanged solution was diluted with water to an $SiO_2$ content of 5.20 and alkalized with 1350 g of sodium silicate solution with an $SiO_2$ content of 5.5%. The $SiO_2$ content at alkalization was thus about 5.25%.

The solution was then heat treated during 40 minutes at 38° C. and then cooled to room temperature.

The sol was subsequently aluminum modified in order to stabilize the high surface area. The modification was carried out according to the following: To 5000 g of the solution cation ion exchange resin saturated with hydrogen ion was added under stirring until the pH of the solution fell to about 7.5 and the cation exchange resin was then filtered off. This treatment improves the stability of the final product since a lower sodium content is obtained. The solution was heated to 35° C. and 56.55 g of sodium aluminate solution were then added. Before use the aluminate had been diluted with 443.5 g of water.

After complete aluminate addition the obtained sol A had particles with a specific surface area of about 910 $m^2/g$ and the surface area had good stability. The S-value for the sol was 32. The degree of aluminum modification was 10% and the pH value was about 9.5.

EXAMPLE 1B

The prepared aluminum modified sol A was treated in order to obtain the corresponding sol with a higher degree of aluminum modification. To 1000 g of sol A ion exchange resin IR-120 was added under stirring until the pH value had decrease to about 7.5. This was made so that the pH value at the aluminum modification would not be too high and lead to impaired stability.

The ion exchange resin was filtered off, the solution was heated to 35° C. and then 6.60 g of sodium aluminate solution was added during 45 minutes. The aluminate solution was diluted with 58.4 g of water before it was added.

Sol B did hereby get a higher degree of aluminum modification than sol A, namely 15%, but it did otherwise correspond to sol A.

EXAMPLE 1C 3400 g of sodium silicate solution with an $SiO_2$ content of 24.2% was diluted with 8800 g of water (to an $SiO_2$ content of 6.74%).

This solution was ion exchanged in a column, according to Example 1A, to a pH of about 2.5.

1100 g of the ion exchanged solution was diluted with water to an $SiO_2$ content of 6.54%; alkalized with 1100 g of sodium silicate solution with an $SiO_2$ content of 6.74%. The $SiO_2$ content at the alkalization was thus about 6.55%. Heat treatment was carried out as in Example 1A.

5000 g of the sol was aluminum modified as in Example 1A.

The amount of sodium aluminate which was added was in this example 69.4 g and it had before the addition been diluted with 580.6 g of water. The obtained sol C had particles with a specific surface area of 894 m²/g and an S-value of 13%. The degree of aluminum modification was 10%.

EXAMPLE 1D

The pH of 1000 g of the sol C was lowered by means of cation ion exchange resin in the same manner as in Example 1B.

When the ion exchange resin had been filtered off the solution was heated to 35° C. and 7.4 g of sodium aluminate solution was then added under stirring. The aluminate solution was diluted before addition with 67.6 g of water. Hereby the degree of aluminum modification became 15%.

EXAMPLE 1E

A sodium silicate solution was diluted with water and ion exchanged in a column so that a sol with an $SiO_2$ content of 5.23% was obtained.

To 4000 g of this 415 g of sodium silicate solution with an $SiO_2$ content of 5.25% was added.

The alkalized solution was heat treated at 40° C. during 40 minutes and then cooled immediately.

The surface was then stabilized by means of aluminum modification in the same manner as described earlier. To 2000 g of sol 23.9 g of aluminate solution, which had been diluted with water to 240 g, were added. The obtained sol had particles with a specific surface area of 863 m²/g, an S-value of 32% and a degree of aluminum modification of 10%.

EXAMPLE 1F

In the same manner as in Example 1E a sodium silicate solution was ion exchanged so that the $SiO_2$ content of the acid sol became 6.30%.

To 4000 g of this 499.7 g of water glass solution with an $SiO_2$ content of 5.25% were added. The $SiO_2$ content at alkalization was thus 6.18%. The sol was heat treated in the same manner as in Example 1E.

The sol was then aluminum modified in the same manner as in Example 1E and hereby 28.6 g of aluminate solution, diluted with water to 280 g, were added to 2000 g of sol.

The particles in the resulting sol F had a specific surface area of 873 m² /g and the sol had an S-value of 21%. The degree of aluminum modification was 10%.

EXAMPLE 1G 1000 g of sol F were taken after the heat treatment but before the aluminum modification.

This sol was aluminum modified according to the same process but to a lower degree of modification. To 1000 g of sol only 7.1 g of sodium aluminate solution, which had been diluted with 62.9 g of water before addition, were added. The obtained sol had a degree of aluminum modification of 5%.

EXAMPLE 1H

To 1000 g of the prepared sol F ion exchange resin (Amberlite-IR-120) was added to a pH of about 7.5 and the ion exchange resin was then filtered off.

The aluminum modification was then continued. This time 7.0 g aluminate solution diluted with 63 g of water were added so that the final sol H had a degree of aluminum modification of 15%.

EXAMPLE 1J

A water glass solution with an $SiO_2$ to $M_2O$ ratio of 3.53 was diluted to a content of 7.05% and ion exchanged in a column.

To 4000 g of the acid sol which had been produced at the ion exchange 376.1 g of water and 392.4 g of water glass solution with a content of 7.05% were added.

The alkalized solution was allowed to ripen at room temperature for a night.

The high surface area was then stabilized by means of aluminum modification. To 2000 g of the sol were added 31.4 g of sodium aluminate which before addition had been diluted with 268.6 g of water. The obtained sol J had particles with a specific surface area of 962 m²/g and an S-value of 12% and a degree of aluminum modification of 10%.

EXAMPLE 1K

The alkalized and heat treated but not aluminum modified sol according to Example 1J was aluminum modified in this example to a lower degree of modification. To 2000 g of the sol were added 15.7 g of sodium aluminate solution which before the addition had been diluted with 134.3 g of water. Hereby a degree of aluminum modification of 5% was obtained.

EXAMPLE 1L

A water glass solution was diluted and ion exchanged in a large column so that 930 kg of sol with an $SiO_2$ content of 6.24% was obtained. To this 66 kg of water and 26 kg of water glass solution with an $SiO_2$ content of 23.4% were added. The solution was heat treated at room temperature during a night. The sol was cation exchanged in an ion exchange column and after adjustment of pH it was aluminum modified in a reactor vessel by addition of sodium aluminate. The amount of aluminate solution was 7.2 kg and it had been diluted with 22.8 kg of water before addition. The total time for charging was 4 hours. The obtained sol had particles with a specific surface area of 828 m²/g, an S-value of 25% and a degree of surface aluminum modification of 5%.

EXAMPLE 2a)–2f)

In the following tests the new sols were evaluated for paper production in combination with cationic polymers.

Retention properties were evaluated by means of a Britt Dynamic Drainage Jar at 800 rpm. This is the conventional test method for retention in paper industry.

The dewatering was evaluated in a Canadian Standard Freeness (CSF) Tester according to SCAN-C 21:65. The chemicals were added to a Britt Dynamic Drainage Jar with a blocked outlet at 800 rpm during 45 seconds and the stock system was then transferred to the freeness apparatus. The dewatering results are given as ml CSF.

EXAMPLE 2a)

In this example the stock was made up from 60% bleached birch sulfate and 40% bleached pine sulfate. 30% of chalk were added to the stock as filler and it was then diluted to a concentration of 5 g/l. Then 1 g/l of $Na_2SO_4 \cdot 10H_2O$ was added.

The stock had a fines fraction of 37.2% and a pH of 7.5.

As cationic polymer cationic starch (CS) with a degree of substitution of 0.042 and cationic polyacrylamide (PAM) with medium high charge and a fairly high molecular weight were used, alone or in combination. In the example sol G according to Example 1 was used. As a comparison an aluminum modified silicic acid sol with a specific surface area of 500 m²/g, as disclosed in PCT application WO86/00100, was used. The chemicals were added in the order cationic starch, cationic polyacrylamide, sol and the retention was evaluated. All amounts in the Table below are given calculated on dry stock system.

| CS kg/t | PAM kg/t | Sol G kg/t | Commercial sol kg/t | Retention % |
|---|---|---|---|---|
| — | — | — | — | 18.0 |
| 10 | | | | 35.9 |
| | 0.3 | | | 53.5 |
| 10 | 0.3 | | | 51.7 |
| 10 | | 0.5 | | 61.2 |
| 10 | | 1.0 | | 79.2 |
| 10 | | | 0.5 | 47.9 |
| 10 | | | 1.0 | 60.1 |
| 10 | 0.3 | 0.5 | | 71.1 |
| 10 | 0.3 | 1.0 | | 86.7 |
| 10 | 0.3 | | 0.5 | 61.8 |
| 10 | 0.3 | | 1.0 | 70.7 |

This example shows the considerable improvement in retention with a sol containing particles having a high specific surface area and a low S-value according to the present invention in comparison with a commercial sol of a lower surface area. At the use of 10 kg/ton of cationic starch and 0.5 kg/ton of sol the retention is increased from 47.9 to 61.2% and at 1.0 kg/ton of sol the retention is increased from 60.1 to 79.2%.

If 0.3 kg/ton of cationic polyacrylamide is also included the retention is increased from 61.8 to 71.1% at a sol dosage of 0.5 kg/ton and from 70.7 to 86.7 at a sol dosage of 1.0 kg/ton.

Solely 0.3 kg/ton of cationic polyacrylamide gives a retention of 53.5% and if additionally 10 kg/ton of cationic starch are added the retention is decreased to 51.7%. However, by using a combination of the two polymers with sol an unexpectedly high effect is obtained.

EXAMPLE 2b

In this example the dewatering effect for the sols A, B, C and D was evaluated.

The stock was a mixture of 60% bleached birch sulfate and 40% bleached pine sulfate. To the stock 30% of chalk were added as filler. This stock was then diluted to a concentration of 3 g/l and then 1 g/l of $Na_2SO_4 \cdot 10H_2O$ was added. The pH of the stock was 7.5 and the dewatering capability was 380 ml CSF. As cationic polymer cationic starch with a degree of substitution of 0.038 was used and this was added first followed by sol. As a reference the same aluminum modified silica sol with a specific surface area of 500 $m^2$/g as in Example 1 was used.

| CS kg/t | Sol A kg/t | Sol B kg/t | Sol C kg/t | Sol D kg/t | Commercial sol kg/t | CSF ml |
|---|---|---|---|---|---|---|
| 8 | — | — | — | — | — | 420 |
| 8 | 0.5 | | | | | 510 |
| 8 | 1.0 | | | | | 610 |
| 8 | 1.5 | | | | | 640 |
| 8 | | 0.5 | | | | 500 |
| 8 | | 1.0 | | | | 620 |
| 8 | | 1.5 | | | | 660 |
| 8 | | | 0.5 | | | 490 |
| 8 | | | 1.0 | | | 580 |
| 8 | | | 1.5 | | | 600 |
| 8 | | | | 0.5 | | 510 |
| 8 | | | | 1.0 | | 600 |
| 8 | | | | 1.5 | | 635 |
| 8 | | | | | 0.5 | 470 |
| 8 | | | | | 1.0 | 530 |
| 8 | | | | | 1.5 | 570 |

As evident all the sols A to D are more effective than the commercial sol with a surface area of 500 $m^2$/g.

EXAMPLE 2c

The sols E, F, G and H were evaluated in the same stock system as in Example 2b. However, the stock batch had been beaten somewhat more so the freeness value was 310 ml CSF before addition of cationic starch. At addition of only 5 kg/ton of cationic starch the freeness value was 360 ml CSF. In all tests shown below the cationic starch, the same as in Example 2a, was added in an amount of 5 kg/ton and it was added before the sol. As reference the same commercial sol as in earlier Examples was used.

| Sol E kg/t | Sol F kg/t | Sol G kg/t | Sol H kg/t | Commercial sol kg/t | CSF ml |
|---|---|---|---|---|---|
| 0.25 | | | | | 405 |
| 0.5 | | | | | 415 |
| | 0.25 | | | | 420 |
| | 0.5 | | | | 430 |
| | | 0.25 | | | 425 |
| | | 0.5 | | | 445 |
| | | | 0.25 | | 395 |
| | | | 0.5 | | 415 |
| | | | | 0.25 | 375 |
| | | | | 0.5 | 400 |

As evident from this example the dosage of the new sols can be reduced to half the amount in comparison with the commercial sol and still give as good or better results than this.

EXAMPLE 2d

To study the effect of the new sols with high specific surface area at an acid pH a stock was prepared from 60% bleached birch sulfate and 40% bleached pine sulfate without addition of filler. pH was adjusted to 5.3 with diluted sulfuric acid and the stock was diluted to a concentration of 3 g/l. To the thus obtained stock 0.5 kg/ton of alum, calculated as $Al_2(SO_4)_3 \cdot 18H_2O$, were added. As cationic polymer cationic starch (CS) with a degree of substitution of 0.035 was used in combination with polyethyleneimine (PEI). The sol was sol L and the same commercial sol as earlier was used as reference. Without addition of chemicals the stock had a CSF value of 200 ml.

| CS kg/t | PAM kg/t | Poly(DADMAC) kg/t | PAA kg/t | Sol L kg/t | Commercial sol kg/t | CSF ml |
|---|---|---|---|---|---|---|
| 6 | | | | | | 240 |
| 6 | 0.3 | | | | | 310 |
| 6 | | 0.3 | | | | 295 |
| 6 | | | 0.3 | | | 285 |
| 6 | | | | 1.0 | | 395 |
| 6 | | | | | 1.0 | 330 |
| 6 | 0.3 | | | 1.0 | | 500 |
| 6 | 0.3 | | | | | 395 |
| 6 | | 0.3 | | | | 455 |

-continued

| CS kg/t | PAM kg/t | Poly(DADMAC) kg/t | PAA kg/t | Sol L kg/t | Commercial kg/t | CSF ml |
|---|---|---|---|---|---|---|
| 6 | | 0.3 | | | 1.0 | 345 |
| 6 | | | | 0.3 | 1.0 | 425 |
| 6 | | | 0.3 | | 1.0 | 340 |

EXAMPLE 2e

In this test the dewatering effect using different cationic synthetic polymers and cationic starch (CS) together with sol L was investigated. The same commercial sol as earlier was used as reference. In this example a groundwood stock having a concentration of 3 g/l and a pH of 7.8 was used. The freeness value for the stock without addition of chemicals was 180 ml CSF. The cationic synthetic polymers were cationic polyacrylamide (PAM), poly(diallyldimethyl ammonium chloride) (Poly(DADMAC)) and cationic polyamidoamine (PAA).

| CS kg/t | PEI kg/t | Sol L kg/t | Commercial sol kg/t | CSF ml |
|---|---|---|---|---|
| 5 | 0,25 | | | 215 |
| 5 | 0,25 | 0,75 | | 310 |
| 5 | 0,25 | | 0,75 | 260 |

As evident an unexpected improvement was obtained when the sols were used in combination with both cationic starch and a cationic synthetic polymer.

EXAMPLE 2f

In this example the dewatering effect for a groundwood stock at an acid pH was investigated. The pH of the stock was 5.2, its concentration was 3 g/l and to the stock had been added 2 kg/t of alum, calculated as $Al_2(SO_4)_3 \cdot 18H_2O$. This stock had an original CSF value of 185. As cationic polymer a cationic starch (CS) with a degree of substitution of 0.045 was used, alone and in combination with cationic polyacrylamide (PAM), which was the same as in Example 2a). Cationic polymer was added before the sol which in this case was sol L. As comparison the same commercial sol as earlier was used.

| CS kg/t | PAM kg/t | Sol L kg/t | Commercial kg/t | CSF ml |
|---|---|---|---|---|
| 5 | | | 0.75 | 345 |
| 5 | | | 1.0 | 365 |
| 5 | | 0.5 | | 375 |
| 5 | | 0.75 | | 395 |
| 5 | 0.2 | | 0.5 | 400 |
| 5 | 0.2 | | 0.75 | 430 |
| 5 | 0.2 | 0.5 | | 470 |
| 5 | 0.2 | 0.75 | | 500 |

These tests show the good properties of the new sols in acid stocks, the low dosage required to reach very good results and also the very good effect which is obtained when the sols are combined with both a natural and a synthetic cationic polymer.

We claim:

1. A process for producing paper, comprising the steps of
   (a) forming an aqueous suspension containing cellulose fibers;
   (b) adding to said suspension a cationic polymer, said cationic polymer being a retention aid and/or wet-strength agent and said cationic polymer being added to said suspension in an amount of at least 0.01 kg/ton, based on dry fibers and optional filler;
   (c) adding to said suspension a stable anionic silica sol having an S-value within the range of from 8 to 45 percent and containing silica particles with a specific surface area within the range of from 750 to 1000 $m^2/g$ which are surface-modified with aluminum to a degree of from 2 to 25 percent, said silica sol being added to said suspension in an amount of at least 0.01 kg/ton, calculated as $SiO_2$ based on dry fibers and optional filler; and
   (d) thereafter dewatering and forming paper from the obtained aqueous suspension on a wire.

2. A process according to claim 1, wherein the sol has an S-value within the range of from 10 to 30 percent.

3. A process according to claim 1, wherein the silica sol particles have a specific surface area within the range of from 800 to 950 $m^2/g$.

4. A process according to claim 2, wherein the silica sol particles have a specific surface area within the range of from 800 to 950 $m^2/g$.

5. A process according to claim 1, wherein the cationic polymer is cationic starch or cationic polyacrylamide.

6. A process according to claim 2, wherein the cationic polymer is cationic starch or cationic polyacrylamide.

7. A process according to claim 3, wherein the cationic polymer is cationic starch or cationic polyacrylamide.

8. A process to claim 1, wherein the cationic polymer is cationic starch and a cationic synthetic polymer, said cationic synthetic polymer selected from the group consisting of cationic polyacrylamide, poly(diallyldimethyl ammonium chloride), polyethyleneimine and cationic polyamidoamine.

9. A process according to claim 2, wherein the cationic polymer is cationic starch and a cationic synthetic polymer, said cationic synthetic polymer selected from the group consisting of cationic polyacrylamide, poly(diallyldimethyl ammonium chloride), polyethyleneimine and cationic polyamidoamine.

10. A process according to claim 3, wherein the cationic polymer is cationic starch and a cationic synthetic polymer, said cationic synthetic polymer selected from the group consisting of cationic polyacrylamide, poly(diallyldimethyl ammonium chloride), polyethyleneimine and cationic polyamidoamine.

11. A process according to claim 1, wherein the suspension contains fillers.

12. A process according to claim 1, wherein the weight ratio of cationic polymer to sol, calculated as $SiO_2$, is at least 0.01:1.

13. A process according to claim 1, further comprising the step of adding an aluminum compound to the suspension.

14. A process according to claim 13, wherein the aluminum compound is selected from the group consisting of alum, aluminates, aluminum chloride, aluminum nitrate, polyaluminum chlorides, polyaluminum sulphates, and polyaluminum chlorides containing sulphate.

15. A process according to claim 13, wherein the weight ration of aluminum compound, calculated at $Al_2O_3$, to sol, calculated as $SiO_2$, is at least 0.01:1.

* * * * *